(12) United States Patent
Hori

(10) Patent No.: US 6,362,927 B1
(45) Date of Patent: Mar. 26, 2002

(54) OPTICAL PICKUP CAPABLE OF PREVENTING TILTING VARIATION OF AN OPTICAL AXIS OF AN OBJECTIVE LENS DURING MOVEMENT THEREOF

(75) Inventor: Ken'ichi Hori, Kawasaki (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/652,498

(22) Filed: Aug. 31, 2000

(30) Foreign Application Priority Data

Sep. 1, 1999 (JP) .......................................... 11-247013

(51) Int. Cl.[7] .............................. G02B 7/02; G11B 7/00
(52) U.S. Cl. ................... 359/813; 359/814; 369/44.14; 369/44.15
(58) Field of Search ................................ 359/813, 814, 359/822, 823, 824; 369/44.14, 44.15, 44.16, 244, 247

(56) References Cited

U.S. PATENT DOCUMENTS 5,461,896 A * 10/1995 Marchant et al. ......... 396/44.16
5,719,834 A * 2/1998 Futagawa et al. ......... 369/44.14
5,724,197 A * 3/1998 Barnes et al. ............... 359/824
6,304,391 B1 * 10/2001 Hori ........................... 359/813

* cited by examiner

Primary Examiner—Georgia Epps
Assistant Examiner—David Seyrafi
(74) Attorney, Agent, or Firm—Frishauf, Holtz, Goodman, Langer & Chick, P.C.

(57) ABSTRACT

In an optical pickup (1) in which an objective lens (6) is moved in a focusing direction by the use of a focusing coil (7) and first and second magnetic circuits (8,9) coupled to the focusing coil, the first and the second magnetic circuits have a first and a second magnetic flux density, respectively. The objective lens is held by a lens holder (5) which is elastically coupled to a damper base (2) through a suspension member (3,4) to be movable in the focusing direction. The lens holder has a first part and a second part which are spaced from each other. In cooperation with the focusing coil, the first and the second magnetic circuit generate first and second force urging a first and a second part of the lens holder in the focusing direction, respectively.

6 Claims, 2 Drawing Sheets

OPTICAL PICKUP CAPABLE OF PREVENTING TILTING VARIATION OF AN OPTICAL AXIS OF AN OBJECTIVE LENS DURING MOVEMENT THEREOF

BACKGROUND OF THE INVENTION

This invention relates to an optical pickup for use in an optical apparatus such as an optical disk drive and, more particularly, to an optical pickup capable of preventing an inclination of an optical axis of an objective lens upon focusing an optical beam on an optical disk.

Referring to FIGS. 1 and 2, a conventional optical pickup 1 comprises a damper base 2, two pairs of suspension wires 3 and 4 (in the figures, one suspension wire alone is illustrated in each pair) having one ends fixed to the damper base 2, a lens holder 5 attached to the other ends of the suspension wires 3 and 4 and elastically supported by the suspension wires 3 and 4 to be swingable and returnable to a predetermined position, an objective lens 6 held by the lens holder 5, a focusing coil 7 attached to the lens holder 5, a first magnetic circuit 8 intersecting one side of the focusing coil 7 which is faced to the damper base 2, and a second magnetic circuit 9 intersecting the other side of the focusing coil 7 which is opposite to the one side.

In the conventional optical pickup 1, the first magnetic circuit 8 has a magnetic flux density equal to that of the second magnetic circuit 9. Therefore, a first force F1 produced between the first magnetic circuit 8 and the focusing coil 7 has an intensity equal to a second force F2 produced between the second magnetic circuit 9 and the focusing coil 7.

The optical pickup 1 further comprises a tracking coil, an optical base, a laser diode, a polarization beam splitter, a collimator lens, a reflection mirror, and a photo diode, although not shown in the figure. These components are irrelevant to the gist of this invention and will not be described herein.

The conventional optical pickup 1 is designed so that an optical axis O of the objective lens 6 is kept in parallel to the vertical direction when the lens holder 5 is moved in a focusing direction (tangential direction) FC of the objective lens 6. In practical use, however, due to various factors known in the art, movement of the lens holder 5 in the focusing direction FC of the objective lens 6 causes predetermined tilting variation of the optical axis O of the objective lens 6 in either a first mode or a second mode which will presently be described.

In the first mode, when the lens holder 5 is shifted upward from the predetermined position, the optical axis O, particularly, an upper portion thereof is inclined towards the damper base 2 as shown in FIG. 2A. When the lens holder 5 is shifted downward from the predetermined position, the upper portion of the optical axis O is inclined away from the damper base 2 as shown in FIG. 2B.

In the second mode, when the lens holder 5 is shifted upward from the predetermined position, the upper portion of the optical axis O is inclined away from the damper base 2 as shown in FIG. 3A. When the lens holder 5 is shifted downward from the predetermined position, the upper portion of the optical axis O is inclined towards the damper base 2 as shown in FIG. 3B.

Upon occurrence of the tilting variation of the optical axis of the objective lens, the optical pickup is deteriorated in characteristics.

SUMMARY OF THE INVENTION

It is therefore an object of this invention to provide an optical pickup which is capable of preventing tilting variation of an optical axis of an objective lens during movement of a lens holder in a focusing direction of the objective lens to thereby prevent deterioration in characteristics of the optical pickup.

Other objects of the present invention will become clear as the description proceeds.

According to the present invention, there is provided an optical pickup which comprises a damper base, a lens holder having a first part and a second part which are spaced from each other in a predetermined direction, a suspension member elastically coupling the lens holder to the damper base to make the lens holder be movable relative to the damper base in a focusing direction perpendicular to the predetermined direction, an objective lens held by the lens holder, a focusing coil fixed to the lens holder, a first magnetic circuit connected to the damper base and coupled to the focusing coil for generating first force in cooperation with the focusing coil to urge the first part of the lens holder in the focusing direction, the first magnetic circuit having a first magnetic flux density, and a second magnetic circuit connected to the damper base and coupled to the focusing coil for generating second force in cooperation with the focusing coil to urge the second part of the lens holder in the focusing direction, the second magnetic circuit having a second magnetic flux density different from the first magnetic flux density.

DESCRIPTION OF PREFERRED EMBODIMENT

Figure 1:
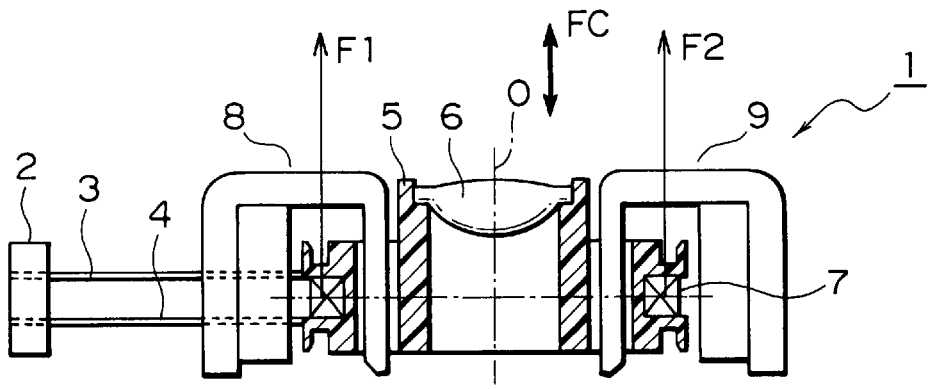
FIG. 1 is a sectional view of a characteristic part of a conventional optical pickup.

Now, description will be made of this invention with reference to the drawing.

Figure 4:
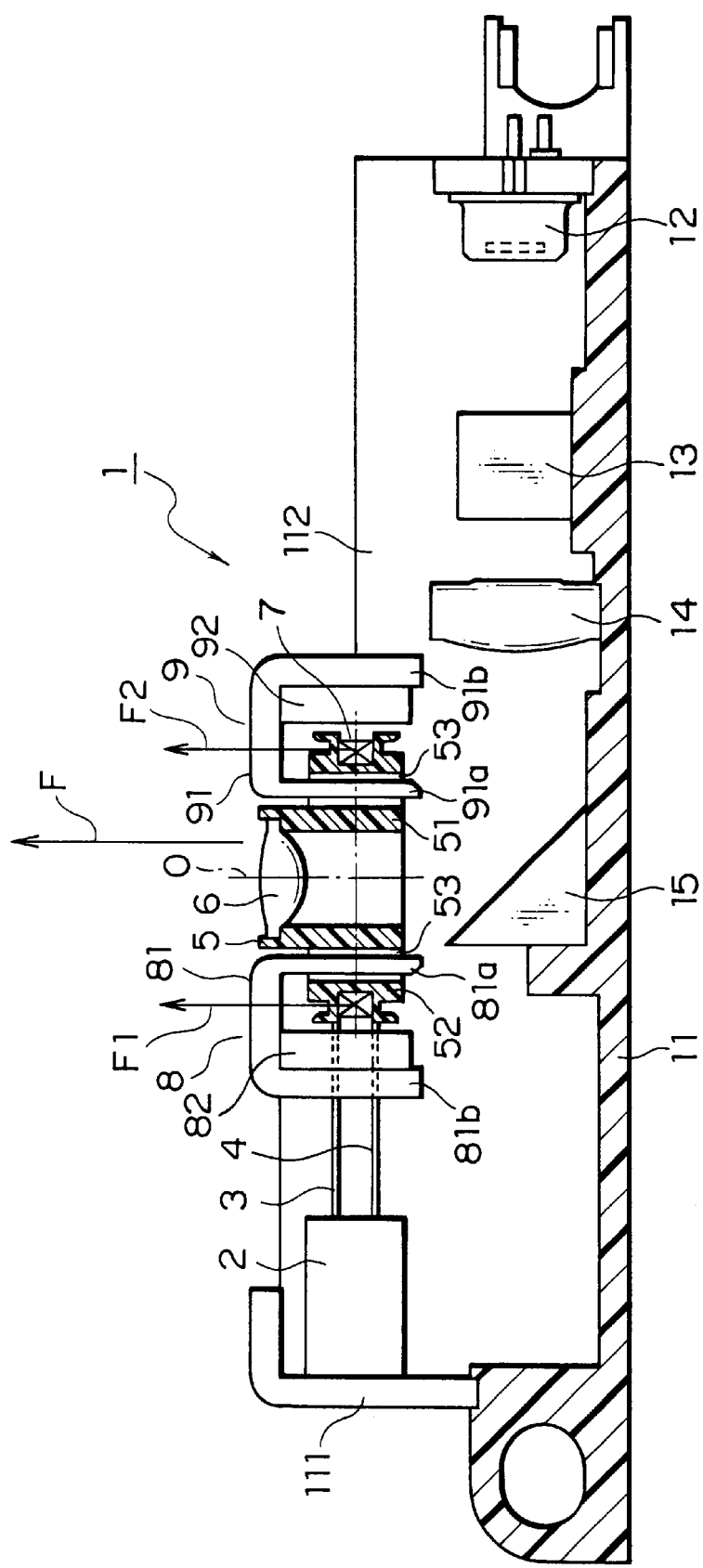
FIG. 4 is a sectional view of an optical pickup according to an embodiment of this invention.

Referring to FIG. 4, an optical pickup 1 according to an embodiment of this invention comprises a damper base 2, two pairs of suspension wires 3 and 4 (in the figures, one suspension wire alone is illustrated in each of the upper and the lower pairs 3 and 4), a lens holder 5, an objective lens 6, a focusing coil 7, a first magnetic circuit 8, and a second magnetic circuit 9. The optical pickup 1 further comprises a tracking coil (not shown), an optical base 11, a laser diode 12, a polarization beam splitter 13, a collimator lens 14, a reflection mirror 15, and a photo diode (not shown).

The optical base 11 has a rear wall 111 and both side walls 112. On the optical base 11, the laser diode 12, the polarization beam splitter 13, the collimator lens 14, the reflection mirror 15, and the photo diode are mounted.

The damper base 2 has a generally rectangular parallelepiped shape and is provided with holes (not shown) for receiving one ends of the suspension wires 3 and 4 to hold the suspension wires 3 and 4. The damper base 2 is rotatably attached to the rear wall 111 of the optical base 11. The one ends of the suspension wires 3 and 4 are inserted into the holes of the damper base 2 and fixed to inner walls of the holes by the use of an adhesive (not shown).

The lens holder 5 has a lens holding portion 51 and a bobbin portion 52. The lens holding portion 51 has a generally cylindrical shape. The bobbin portion 52 has a generally cylindrical shape and surrounds the lens holding portion 51 to be coaxial with the lens holding portion 51. The lens holding portion 51 and the bobbin portion 52 are connected to each other by a connecting member (not shown) to form a gap 53 therebetween. The bobbin portion 52 includes a first part and a second part which are opposite to each other in a predetermined direction along a sheet plane of FIG. 4. In other words, the first and the second parts are spaced from each other in a radial direction of the bobbin portion 52.

The other ends of the suspension wires 3 and 4 are inserted into the first part of the bobbin portion 52 of the lens holder 5 and fixed thereto by the use of an adhesive or the like. With this structure, the lens holder 5 is elastically supported by the suspension wires 3 and 4 to be swingable and returnable to a predetermined position. In other words, the suspension wires 3 and 4 elastically couple the lens holder 5 to the damper base 2 to make the lens holder 5 be movable in a focusing direction which is perpendicular to the predetermined direction and parallel to an optical axis O of the objective lens 6. A combination of the suspension wires 3 and 4 is referred to as a suspension member.

The lens holder 5 is provided with a tracking coil, although not shown in the figure. The tracking coil serves to move the lens holder 5 in a direction perpendicular to the sheet plane of FIG. 4.

The objective lens 6 is received and held in an upper end portion of the lens holding portion 51 of the lens holder 5.

The focusing coil 7 is wound around the bobbin portion 52 of the lens holder 5 and therefore extends substantially on a plane perpendicular to the focusing direction. In the manner which will later be described, the focusing coil 7 serves to move the lens holder 5 in a tangential direction, i.e., along an optical axis O of the objective lens 6.

The first magnetic circuit 8 comprises a first yoke 81 and a first permanent magnet 82 and intersects one side of the focusing coil 7 which is faced to the damper base 2. The first yoke 81 is extended between and connected to the side walls 112 of the optical base 11. This means that the first magnetic circuit 8 is connected to the damper base 2 through the optical base 11.

The first yoke 81 has a center portion having a generally U-shaped section. The center portion of the first yoke 81 has a first inner protruding member 81a and a first outer protruding member 81b protruding downward and located inside and outside in a radial direction of the optical pickup 1, respectively. The first inner protruding member 81a is inserted into the gap 53 of the lens holder 5. The first permanent magnet 82 is fixed to an inner surface of the second outer protruding member 81b to face the one side of the focusing coil 7 which is faced to the damper base 2. Thus, the first magnetic circuit 8 is coupled to the focusing coil 7 to generate first force F1 when the focusing coil 7 is energized. The first force F1 acts to urge upwardly the first part of the lens holder 5.

The second magnetic circuit 9 comprises a second yoke 91 and a second permanent magnet 92 and intersects the other side of the focusing coil 7 which is opposite to the one side. The second yoke 91 is extended between and connected to the side walls 112 of the optical base 11. This means that the second magnetic circuit 9 is connected to the damper base 2 through the optical base 11.

The second yoke 91 has a center portion having a generally U-shaped section. The center portion of the second yoke 91 has a second inner protruding member 91a and a second outer protruding member 91b protruding downward and located inside and outside in the radial direction of the optical pickup 1, respectively. The first inner protruding member 81a is inserted into the gap 53 of the lens holder 5. The second permanent magnet 92 is fixed to an inner surface of the second outer protruding member 91b to face the other side of the focusing coil 7 which is opposite to the one side. Thus, the second magnetic circuit 8 is coupled to the focusing coil 7 to generate second force F2 when the focusing coil 7 is energized. The second force F2 acts to urge upwardly the second part of the lens holder 5.

As described above, each of the first and the second magnetic circuits 8 and 9 intersects with a winding of the focusing coil 7. Therefore, when the focusing coil 7 is supplied with an electric current, the first and the second forces F1 and F2 are generated between the focusing coil 7 and the first magnetic circuit 8 and between the focusing coil 7 and the second magnetic circuit 9, respectively. Under the action of the first and the second forces F1 and F2, the lens holder 5 is moved along the optical axis O of the objective lens 6.

Furthermore, the first and the second magnetic circuits 8 and 9 are different in magnetic flux density. More particularly, the first magnetic circuit 8 has a first magnetic flux density while the second magnetic circuit 9 has a second magnetic flux density different from the first magnetic flux density. The first and the second forces F1 and F2 are proportional to the first and the second magnetic flux densities, respectively. Herein, let a shifting force to shift the lens holder 5 be represented by F. Then, the shifting force F is a resultant force or combinational force of the first and the second forces F1 and F2.

Figure 2A:
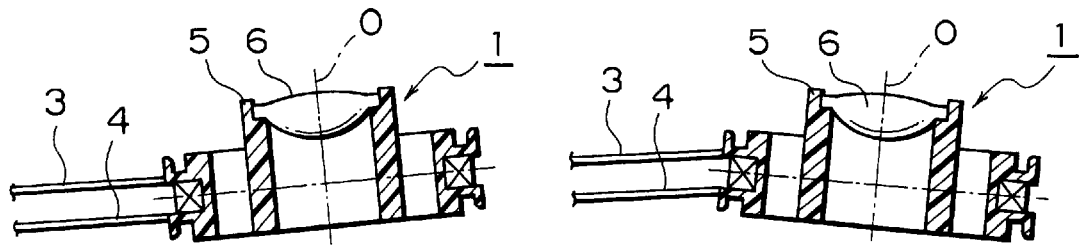
FIGS. 2A and 2B are for describing a first mode of tilting variation of an optical axis in the conventional optical pickup illustrated in FIG. 1.
Figure 2B:
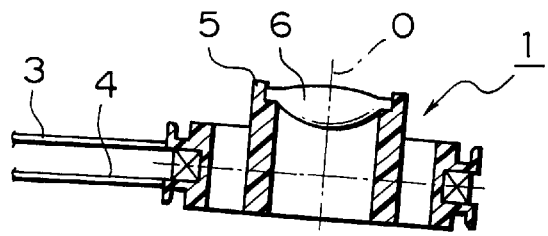

It will be assumed here as a first case that the optical pickup 1 is intended to deal with the tilting variation of the optical axis illustrated in FIGS. 2A and 2B. In the first case, the first magnetic flux density is determined to be higher than the second magnetic flux density. The electric current is supplied to the focusing coil 7 to be kept constant. In this event, the first force F1 is greater than the second force F2. Thus, it is possible to prevent the tilting variation of the optical axis O illustrated in FIGS. 2A and 2B.

Figure 3A:
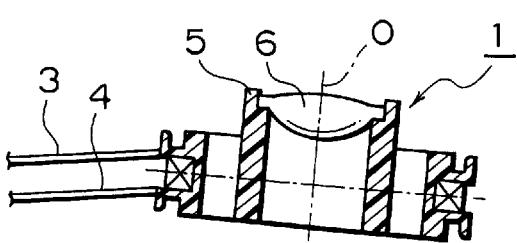
FIGS. 3A and 3B are for describing a second mode of tilting variation of an optical axis in the conventional optical pickup illustrated in FIG. 1.
Figure 3B:
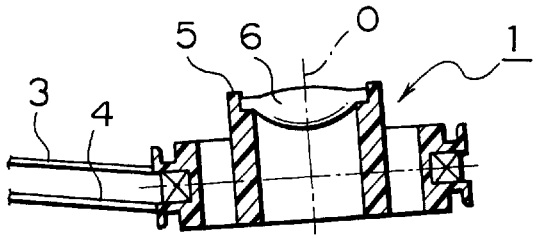

In a second case where the optical pickup 1 is intended to deal with the tilting variation of the optical axis illustrated in FIGS. 3A and 3B, the first magnetic flux density is determined to be lower than the second magnetic flux density. The electric current is supplied to the focusing coil 7 to be kept constant. In this event, the first force F1 is less than the second force F2. Thus, it is possible to prevent the tilting variation of the optical axis O illustrated in FIGS. 3A and 3B.

Therefore, the tilting variation of the optical axis of the objective lens 6 can be avoided when the lens holder 5 is moved in the focusing direction. As a consequence, the optical pickup 1 is prevented from deterioration in characteristics.

The difference between the first and the second magnetic flux densities can be achieved in various manners, for example, by the use of the permanent magnets different in residual magnetic flux density, by differing the width of the gap between the permanent magnet and the yoke, and by allowing the leakage of magnetic flux from the yoke.

U.S. patent application Ser. No. 09/448,792, the disclosure of which is herein incorporated by reference, discloses an optical pickup in which an objective lens is moved by the use of electromagnetic force.

What is claimed is:

1. An optical pickup comprising:

a damper base;

a lens holder having a first part and a second part which are spaced from each other in a predetermined direction;

a suspension member elastically coupling said lens holder to said damper base to make said lens holder be movable relative to said damper base in a focusing direction perpendicular to said predetermined direction;

an objective lens held by said lens holder;

a focusing coil fixed to said lens holder;

a first magnetic circuit connected to said damper base and coupled to said focusing coil for generating first force in cooperation with said focusing coil to urge said first part of the lens holder in said focusing direction, said first magnetic circuit having a first magnetic flux density; and a second magnetic circuit connected to said damper base and coupled to said focusing coil for generating second force in cooperation with said focusing coil to urge said second part of the lens holder in said focusing direction, said second magnetic circuit having a second magnetic flux density different from said first magnetic flux density.

2. An optical pickup as claimed in claim 1, wherein said first magnetic flux density is determined to be higher than said second magnetic flux density.

3. An optical pickup as claimed in claim 1, wherein said first magnetic flux density is determined to be lower than said second magnetic flux density.

4. An optical pickup as claimed in claim 1, wherein said focusing coil extends substantially on a plane perpendicular to said focusing direction, said first magnetic circuit intersecting said focusing coil at said first part of the lens holder, said second magnetic circuit intersecting said focusing coil at said second portion of the lens holder.

5. An optical pickup as claimed in claim 1, wherein said suspension member is connected to said first part of the lens holder.

6. An optical pickup as claimed in claim 1, wherein said suspension member comprises two pair of suspension wires which are arranged parallel to one another, each of suspension wires having an end fixed to said damper base and another end fixed to said lens holder.

* * * * *